United States Patent [19]
Schmermund

[11] 3,912,995
[45] Oct. 14, 1975

[54] CURVE MILLING OR CURVE GRINDING MACHINES INCLUDING FEED RATE CONTROL

[76] Inventor: Alfred Schmermund, 62 Kornerstrasse, 5820 Gevelsberg, Germany

[22] Filed: Dec. 6, 1973

[21] Appl. No.: 422,483

[30] Foreign Application Priority Data
Dec. 21, 1972 United Kingdom............... 59036/72

[52] U.S. Cl.................................. 318/571; 318/39
[51] Int. Cl.$^2$.......................................... G05B 19/24
[58] Field of Search............................. 318/571, 39

[56] References Cited
UNITED STATES PATENTS

| | | | |
|---|---|---|---|
| 3,015,806 | 1/1962 | Wang et al...................... | 318/571 X |
| 3,184,663 | 5/1965 | Mergler.......................... | 318/571 X |
| 3,191,111 | 6/1965 | Greene........................... | 318/571 X |
| 3,541,417 | 11/1970 | Frank, Jr. ........................ | 318/571 |

Primary Examiner—T. E. Lynch
Attorney, Agent, or Firm—Sughrue, Rothwell, Mion, Zinn & Macpeak

[57] ABSTRACT

A milling or grinding machine for shaping a workpiece is disclosed wherein a shaping tool is displaced relative to a rotatable workpiece in accordance with coded displacement values of a series of signals stored on a perforated tape. The signals are extracted from the tape serially and are applied to computer means, which provides further signals each coded to represent a displacement value in predetermined proportionality to the displacement represented by a respective one of the extracted signals. These further signals are translated into command signals, which are applied to a stepping motor for imparting displacement to means supporting the shaping tool. The stored signals are extracted from the tape in response to output pulses derived from a frequency divider network, the input of which is connected to a pulse generator. The pulse generator is so coupled to means for rotating the workpiece as to provide a plurality of pulses for each predetermined angular displacement of the workpiece. The frequency divider network includes a plurality of successively connected frequency divider devices, each of which is manually settable to provide output pulses equal in number to the number of pulses applied to the input of the selected frequency divider device divided by the respective divider ratio to which the selected divider device is set. By adjusting the divider ratios set at the respective divider devices, the angular displacement of the workpiece is correlated with the displacement of the shaping tool in a predetermined manner.

9 Claims, No Drawings

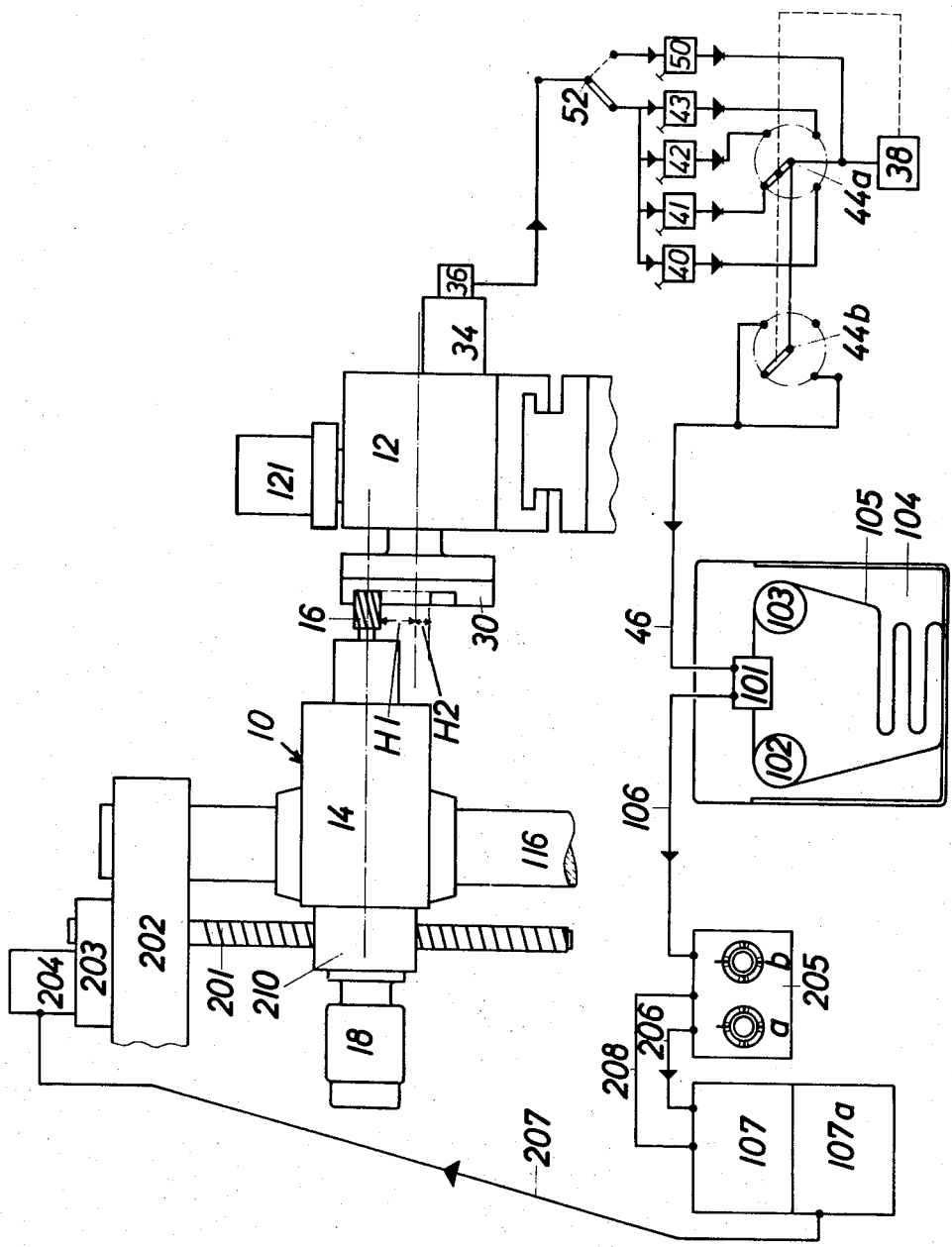

CURVE MILLING OR CURVE GRINDING MACHINES INCLUDING FEED RATE CONTROL

BACKGROUND OF THE INVENTION

The invention relates to curve milling or curve grinding machines.

On machines of this kind, cam discs or cam cylinders are manufactured which have a curved surface conforming to a predetermined law. This conformity of the curve will be briefly designated as "the law of the curve". In some applications, the circumferential surface of a cam disc cylinder may describe an archimedean spiral in which the rise and fall of a co-operating cam follower takes place in accordance with the so called "trapezium of acceleration".

Such machines have a workpiece spindle, on which the workpiece is firmly clamped and which is slowly rotated by a drive motor while the workpiece is machined by a suitable tool. The tool, such as a milling or grinding tool, is carried by a tool support, which is displaced in dependence upon the law of the curve to be machined on the rotating workpiece, while the workpiece spindle rotates about a fixed axis. The tool support is displaced relative to the axis of the workpiece spindle in dependence upon the displacement relationship predetermined by the law of the curve. Thus, each variation of the position of the workpiece due to the rotation of the workpiece spindle must be accompanied by an associated displacement of the tool support; when the desired curve in a definite region, the so called "dwell", has a constant radius, then the displacement of the tool during this period is, of course, zero.

It is known that a single master template may be utilized to control the displacement of the tool support in a machine tool when curved surfaces are to be produced on respective workpieces which differ from each other only in scale. In such a known machine, the displacement of the master template takes place in proportion to angular displacement of the workpiece spindle in an analogue fashion and the transmission of the requisite corresponding displacement to the tool support, which displacement is determined by the shape of the master template, also takes place in an analogue fashion. The stroke scale factor is set by a linkage effective in the scanning of the master template, while the angle scale factors are embodied by different time control curves. This machine requires for each curve law only a single master template, which in each case according to the angular extent of the individual fall and rise sections as well as dwell section of the curve to be produced are moved by different time control curves, which however are substantially simpler to manufacture than the master template.

SUMMARY OF THE INVENTION

According to the present invention, there is provided a shaping machine comprising tool support means displaceably mounted on a frame, workpiece support means rotatably mounted on the frame, first displacement means to rotatably displace the workpiece support means, second displacement means to displace the tool support means relative to the workpiece support means, a repetitious signal generator coupled to the first displacement means to generate a predetermined number of repetitious signals on each predetermined angular displacement of the workpiece support means, divider means to provide an output signal on the generation of each of a predeterminable number of the repetitious signals, selectably operable setting means to set the divider means to determine the numerical value of the predeterminable number, storage means to store a series of signals each located in a respective location of the storage means and each coded to represent a respective predetermined displacement of the tool support means, extractor means selectively connected to the divider means and responsive to each signal output from the divider means and applied to the extractor means to extract the signal stored in a respective location of the storage means, computer means connected to the extractor means to receive the signals extracted thereby and to provide further signals each coded to represent a displacement value in predetermined proportionality to the displacement represented by a respective one of the extracted signals; and translator means connected to the computer means to receive the further signals therefrom, to translate the further signals into command signals and to apply the command signals to the second displacement means.

Preferably, the computer means comprises control means selectable variable to set the predetermined proportionality between zero and unity.

Advantageously, the computer means comprises further control means presettable to generate further signals respectively coded to represent displacements of the tool support means from a datum position and corresponding to the minimum and maximum diameters of a workpiece supported by the workpiece support means in operative juxtaposition to the tool support means.

Expediently, each of the signals stored in the storage means comprises a series of component signals, the number of such component signals in each series representing a displacement to be imparted to the tool support means.

The computer means may comprise frequency divider means, a potentiometer, and/or digital analogue translating means.

Advantageously, the second displacement means comprises a stepping motor, and the command signals generated by the translator means each comprise a plurality of pulsed signals corresponding in number to the incremental displacement represented by the respective one of the extracted signals.

Preferably, fixed-ratio transmission means are provided to couple the stepping motor to the tool support means.

The stepping motor may comprise an hydraulically, pneumatically or electrically operable stepping motor.

The storage means may comprise a loop of either perforated or magnetisable tape.

The second displacement means may comprise a rotatable disc coupled to disc position control means, the position control means being responsive to each command signal to impart an incremental angular displacement to the disc corresponding to the displacement represented by the extracted signal corresponding to the respective command signal.

The repetitious signal generator may comprise an electrical pulse generator.

The divider means may comprise a plurality of divider devices each having respective input means and respective output means, each divider device providing a plurality of the output signals at the respective output means corresponding to the number of the repetitious signals applied to the respective input means divided by a respective divider ratio settable by the setting means.

The repetitious signal generator may comprise pneumatic means coupled to the first displacement means to generate a predetermined number of repetitious pneumatic signals on each predetermined angular displacement of the workpiece support means.

The repetitious signal generator may comprise hydraulic means coupled to the first displacement means to generate a predetermined number of repetitious hydraulic signals on each predetermined angular displacement of the workpiece support means.

The repetitious signal generator may comprise a light source, and means responsive to light from the source and coupled to the first displacement means to generate a predetermined number of repetitious optical signals on each predetermined angular displacement of the workpiece support means.

BRIEF DESCRIPTION OF THE DRAWINGS

An embodiment of the invention will now be more particularly described with reference to the single FIGURE of the accompanying drawing, which shows a block schematic diagram of an automatically controlled machine tool for grinding or milling a curved surface on a workpiece.

DESCRIPTION OF THE PREFERRED EMBODIMENT

The single FIGURE of the drawing shows tool support means 10 and workpiece support means 12 of a machine tool. The tool support 10 includes a slidable table 14, which is of settable height, to effect the application of a milling tool 16 to a workpiece 30 mounted on a rotatable workpiece clamping means provided on a drive shaft. The table 14 is displaced by a stepping motor 204 which is coupled via gearing 203 to a threaded spindle 201. The threaded spindle 201 carries a nut 210 rigidly connected to the table 14. The table 14 is slidably displaceable along a vertical column support 116. When the stepping motor 204 is operated, the spindle 201 rotates and causes the table 14 to be vertically displaced upwardly or downwardly in dependence on the direction of rotation of the spindle 201. The transmission ratio of the coupling between the stepping motor 204 and the table 14 may be non-variable. In the embodiment illustrated, the table 14 is vertically displaceable but the arrangement may be modified to render it either alternatively, or additionally, horizontally displaceable. Also, the table 14 may be displaceable in three mutually perpendicular directions simultaneously. The motor 204 is an electrical stepping motor responsive, in a manner which will be described below, to electrical command signals applied via a conductor 207. However, the motor 204 may be a pneumatic or hydraulic motor.

Also, as shown in the single FIGURE of the drawings, mounted on the slidable tool support table is a direct current motor 18, which drives the milling tool 16 at a predetermined rate of rotation via suitable gearing means (not shown).

As will subsequently be described, the table 14 will be displaced to impart such displacement to the milling tool 16 as will conform with the law of the curve to be milled on a workpiece for example, an acceleration trapezium.

By way of example, the operations for milling the circumferential surface of a workpiece to produce a camming surface will now be described.

A first portion of the peripheral surface of the disc workpiece is milled to provide an arcuate surface of constant radius, this portion corresponds to the upper dwell of a follower co-operating with the finished cam. A second portion, the fall portion, is a curved surface predetermined by the shaped profile of the template and is formed by lowering the milling tool 16 until it reaches its lowest position. A third portion, the lower dwell portion, is of constant radius. A fourth portion, the rise portion, is a curved surface formed by raising the milling tool in accordance with the displacements imparted to the table 14 by the stepping motor 204 in a direction opposite to that followed during the formation of the second portion. A family of many different cam discs, each different in two variables, may be milled. The individual cam discs provided may differ in the distance between their upper and lower dwell portions — these are individually set for each cam disc to be produced in manner which will subsequently be described. The individual discs in the family may also differ in the angular extents of the respective upper dwell, fall, lower dwell and rise portions in each individual disc. The "upper" and "lower" dwell portions are simply portions of constant radius, during the formation of which the sensing means remains stationary at a terminal value.

For the determination of the angular extents of the respective cam portions, a relationship between the vertical movement of the tool 16 and the rotation of the workpiece, must be predetermined. In the example which has been described, this relationship is individually settable for each of the four portions of the cam disc. In the embodiment of the invention described with reference to the drawing, an "electronic gearing" is provided which is adjustable to predetermine this relationship for each portion.

The workpiece support means 12 comprises at least one drive shaft on which the workpiece is firmly clamped. In the embodiment shown in the drawing, two mutually perpendicular drive shafts 30 and 32 are provided to enable curve discs and curve cylinders to be milled or ground. Both these drive shafts are coupled to a common direct current drive motor 34, via stepdown gearing (not shown in detail). The mutually perpendicular drive shafts 30 and 32 may be replaced by a single drive shaft which is so mounted that it may be angularly displaced through 90°.

Connected to the shaft of the drive motor 34 is a repetitious signal generator in the form of a pulse generator 36, which for each rotation of the shaft delivers a predetermined number of pulses — for example 2000 pulses — in uniform time sequence, the pulse repetition frequency being dependent on the speed of rotation of the shaft. The output of the pulse generator 36 is connected to the respective inputs of four frequency dividers 40, 41, 42 and 43, the dividing ratios of which are manually settable. A further frequency divider 50 will be referred to subsequently. A pulse store 38, is connected as shown to the outputs of the frequency dividers 40 to 43. The storage capacity of the store 38 has a predetermined value, for example 72,000 pulses.

The store is so connected together with the frequency dividers 40 to 43 that on the store 38 being counted down to zero, the next frequency divider is connected to the store 38 via an electronic switch — symbolically represented by a switch contact 44a. The store 38 is counted down to zero four times for each complete curved profiled cam disc to be produced by output pulses appearing at the output of each of the dividers 40 to 43. The dividers 40–43 are connected successively by the switch contact 44a during the formation of the four portions of the cam profile described, the switch contact 44a being displaced in response to control signals derived in per se known manner from the store 38. Selected ones of the pulses which drive the store 38 simultaneously drive, via switch 44b and a connection 46 electrical drive means (not shown) of a tape feeder 104 which, in the preferred embodiment, is provided with a loop of perforated tape 105. In response to the output pulses applied via the connection 46, a perforated tape drive motor (not shown) displaces the perforated tape loop 105 past a tape reader 101 to cause signals stored on the tape to be extracted and passed via computer means 205 to translator means in the form of control unit 107. During the formation of the upper and lower "dwell" portions of the workpiece profile, the application of pulses output from the divider devices 41 and 43 to the tape reader 101 is inhibited by the switch 44b. However, the pulses output from the divider devices 41 and 43 are applied during these dwell periods to count-down the store 38, thereby to determine the angular extent of the dwell portions of the workpiece profile.

The perforated tape 105 carries information relating the movement of the tool 16 to the law of the curve to be milled. The tape 105 is in the form of a closed tape loop which is guided over rollers 102 and 103. The precise form in which the tool displacement instructions are coded on the tape will not be described, since any one of a large number of suitable coding systems (patterns of perforation) per se known to those skilled in the art may be employed. By means of the perforated tape loop 105 are stored a plurality of successively arranged coded signals, each signal or group of component signals representing a respective incremental vertical displacement of the tool 16. Thus, the signals stored on the tape 105 represent successive ordinate or incremental ordinate values of a curve defining the successive requisite vertical displacements necessary to cause the tool 16 to mill a predetermined camming surface on the rotating workpiece 30. These values are expressed in suitably coded form, in terms of the number of incremental steps to be performed by motor 204. The coding system may be either analogue or digital.

The signals read from the perforated tape loop 105 by the tape reader 101 are applied, via a conductor 106 to the input of a computer means in the form of ratio varying means 205. These signals represent, in coded form, a predetermined displacement to be imparted to the tool 16 by operation of the stepping motor 204. As indicated above, any suitable coding system may be used for storing these signals on the perforated tape. In one such coding system, each signal derived from the tape reader 101 comprises a series of component signals which represent a given incremental displacement to be imparted to the tool and, in these circumstances, the number of such component signals read in response to each output pulse applied via the line 46 varies in accordance with value of the particular incremental displacement required to be imparted to the tool 16. Thus, in this system of coding, the number of pulses in each series represents the requisite displacement.

The computer means 205 is provided with control means, represented schematically in the drawing by the reference 205a, for varying the displacement significance or magnitude of the command signal generated in a command signal control unit 107 in response to each signal, or series of component signals, read by the reader 101. In this way the actual displacement imparted to the tool 16 in response to each coded displacement value signal read by the reader 101 may be adapted to the particular circumstances, for example the size of the cam to be formed on the workpiece by the tool 16. Thus, the control means 205a operates as a scaling or transmission ratio control element. For example, if the extent of the actual displacement to be imparted to the tool 16 in a particular application amounts to 50% of that defined by the corresponding displacement value signal, or series of component signals, stored on the tape 105, then the corresponding command signal generated in the command signal generator 107 in response to the scaled-down displacement signal transmitted via the control means 205a and a lead 206, is likewise scaled-down by 50%. Thus, in the case where the number in a series of component signals represents the value of each displacement, the control means 205a operates in a manner analogous to frequency divider means.

In this manner each stroke, or incremental displacement, of the tool 16 in response to a respective displacement value signal derived from the tape 105 may be varied between zero and the actual value of the displacement defined by that respective signal. Thus, the computer means 205 comprises control means 205a selectably variable to set the predetermined proportionality between the signals extracted from the tape 105 and the signals applied to the translator means 107 to a value between zero and unity, or to a value greater than unity. The slope of each curved surface portion of a cam formed by the operation of the milling tool 16 may be varied in accordance with the scaling ratio determined by the setting of the control means 205a. The unit 205 is provided with further control means, indicated schematically in the drawing by the reference numeral 205b. The control pulses transmitted via the further control means 205b are applied to an input of the command signal control unit 107 via a conductor 208. The signals generated in the control unit 107 are amplified in a power amplifier 107a. The number, or displacement significance, of these pulses transmitted via the unit 205 may be so pre-set by the control means 205b as to predetermine the position of the tool 16 in relation to the axis of rotation of the workpiece in accordance with the outer diameter (or inner diameter) of the curve to be milled or ground by the tool 16. In the embodiment described with reference to the drawing, the maximum radius (outer dwell) of the cam to be formed is indicated by the reference $H_1$ and the minimum radius (inner dwell) is indicated by the reference $H_2$. Thus, a series of displacements are imparted to the tool 16 at times determined by the transmission of control pulses via the conductor 46. In the circuit arrangements shown in the drawing, the control pulses fed via the conductor 46 are applied to gating means associated with the tape reader 101. These control pulses also control the displacement of the tape 105 by tape drive means, which are not shown in the drawing.

The times at which these control pulses are generated are related, by means of the electronic circuit including the frequency dividers 40 to 43 and 50, to the angular rotation of the workpiece drive shaft 30 or 32.

The displacement signals recorded in coded form on the tape 105 may be directionally coded so as to effect displacement of the stepping motor 204 in both a forward and a reverse direction, thereby controlling both upward and downward displacements of the tool 16. Thus, it is not necessary to reverse the direction of movement of the tape 105. The instructions successively recorded over the length of the closed tape loop correspond to complete the set of displacements to be imparted to the tool 16 as the workpiece is rotated through a complete revolution.

As will be appreciated by those skilled in the art, the perforated tape 105 may be replaced by other storage means, for example, magnetic tapes, or any other suitable storage means for storing a plurality of successively accessible coded values.

Also, the stepping motor 204 may be replaced by any suitable displacement means, such as a disc moving device with exact position control. In the latter case, the second displacement means for displacing the tool carrier 14 comprises a rotatable disc coupled to disc position control means, the position control means being responsive to each command signal to impart an incremental angular displacement to the disc corresponding to the displacement represented by the extracted signal corresponding to the respective command signal.

The stepdown between the shaft of the motor 204 and the workpiece spindle 30 amounts to 12960 : 1 = 36 × 360. That means, that the motor shaft needs 36 revolutions for 1° of workpiece rotation and the pulse generator 36 delivers 36 × 2000 = 72000 pulses for one degree of workpiece rotation. One recognises that in these circumstances, the set dividing ratios of the dividers 40 to 43 correspond to the number of the degrees of angle through which the workpiece is turned while the store 38 is counted down to zero. The setting of the angular displacements of the workpiece for which the upward or downward displacement of the slidable table 14 is to be effected and for which this is to stand still, is to be numerically equal to the respective divider ratios to which the dividers 40 to 43 are set. Thus, no converting calculations are required.

For switching over between the forward and return displacements of the tool 16, the stepping motor 204 is switched over from forward to reverse rotation. This switching over is carried out by switch means (not shown), which are associated with the stepping motor and which between "forward drive" and "reverse drive" positions are provided with a "no drive" position. The switch means are operated in response to switch-over pusles derived at the outputs of the respective dividers, when coincidence with the respective resetting pusle derived from the store 38 is present. Thus, such a switchover pulse is derived from the output pulse from the divider 42 which is coincident with the resetting pulse from the store 38, to cause the switching means associated with the stepping motor 45 to be switched to its "no drive" position. The switching means is maintained in this condition, to inhibit the application of pulses derived during the formation of the lower dwell portion of the workpiece to the stepping motor, until a further switch-over pulse is applied to the switch means. Such a further switch-over pulse is derived from the divider 43 in coincidence with the last pulse preceding the upward displacement of the slidable table 14, that is the pulse coincident with the resetting pulse from the store 38. This latter switch-over pulse causes the switching means associated with the stepping motor 204 to be positioned in the "forward drive" position. Correspondingly, switch-over pulses are derived at the end of the formation of the rising portion of the workpiece profile and at the end of the formation of the "upper dwell" portion of the workpiece profile.

There is also provided a fifth frequency divider 50 which, for example, permits the milling of an archimedean spiral when the template is constructed as a simple triangle. According to the setting of the divider 50 — which can selectably be connected in circuit in place of the dividers 40 to 43 by means of the switch 52 — the spiral extends over a definite predetermined angle, for example 360° with a dividing ratio of 360 pre-set at the divider 50. Here again, the angular degrees according to their digits correspond to the setting of the dividers.

One recognises, that the table 14 is displaced that much more rapidly as the angle over which the total displacement is distributed becomes smaller. That means, that the whole cam profile is accurately produced, irrespective of whether the stroke alters rapidly or slowly so long as the displacement of the table 14 does not take place in too large steps. The tool displacement may be in increments of 0.003 millimetres for each step of the motor 204. Thus, the incremental displacements of the tool support means should lie below the surface irregularity of the miller. The number of the increments though theoretically unlimited, is however determined by the incremental interrogation. By choice of other numerical values, one can of course still further improve the accuracy, particularly when the workpiece is to be ground rather than milled.

In the embodiment which has been described, each of the pulses coming from the pulse generator 36 represents by virtue of its duration (or separation) an incremental angular displacement of the workpiece attached to the spindle 30; the faster the workpiece spindle 30 rotates, the higher is the pulse repetition frequency. If one were to apply this pulse sequence directly to the stepping motor 204, then a different pulse generator would be needed for each desired angular extent; this approach, although it could be taken, would be impractical, since the equipping time would be appreciable. By means of the pulse frequency dividers 40 to 43 (one of which is co-ordinated as described to each portion of the complete curved profile to be formed) the ratio between the angle of rotation of the workpiece and the advance of the tool 16 is settably modified, since according to the division ratio set at the selected divider only each $n^{th}$ pulse is applied to the tape drive motor 104, wherein $n$ represents the set division ratio. In order to be able to accommodate several curve portions on one and the same cam disc, a corresponding plurality of frequency dividers is provided.

In the embodiment of the invention which has been described above electronic components are utilised to relate the displacement of the table 14 to the angular displacement of the workpiece. However, components which do not operate electronically, for example, pneumatic optical or hydraulic components, may be utilised for this purpose. Arrangements utilising different means for transmitting information to correlate the displacement of the table 14 with the angular displacement of the workpiece fall within the scope of the invention.

In one such further embodiment, pneumatically operated means are coupled to the shaft of the motor 34 which are arranged to generate a predetermined number of repetitious pneumatic signals on each revolution of the motor shaft. Also, hydraulically operated means may be utilised to generate the repetitious signals. Similarly, hydraulically operated means may be used to displace the table 14, these means either being coupled to the repetitious signal generator via hydraulic components or being coupled via suitable transducing means to the electrical pulse generator and frequency divider devices.

In another embodiment, the repetitious signal generator comprises a light source and means responsive to light from the source to generate the repetitious signals.

I claim:

1. A shaping machine comprising, in combination:

a frame;

tool support means displaceably mounted on said frame;

workpiece support means rotatably mounted on said frame;

first displacement means to rotatably displace said workpiece support means;

second displacement means to displace said tool support means relative to said workpiece support means;

a repetitious signal generator coupled to said first displacement means to generate a predetermined number of repetitious signals on each predetermined angular displacement of said workpiece support means;

divider means to output a signal on the generation of each of a predeterminable number of said repetitious signals, said divider means comprising a plurality of divider devices each having respective input means and respective output means, each said divider device providing a plurality of said output signals at said respective output means corresponding to the number of said repetitious signals applied to said respective input means divided by a respective divider ratio;

selectably operable setting means to set each said divider device to said divider ratio and thereby to determine the numerical value of said predeterminable number;

first storage means to store said output signals derived from said divider means;

means to derive control signals from said first storage means in dependence on the state thereof;

first connector means responsive to said control signals to connect the respective output means of each said divider device successively to said first storage means;

further storage means to store a series of signals each coded to represent a respective predetermined displacement of said tool support means;

extractor means;

second connector means responsive to said control signals to successively connect the respective output means of selected ones of said divider devices to said extractor means, said extractor means being responsive to successive ones of said signals output from said divider means and applied to said extractor means to serially extract respective ones of said stored signals from said further storage means;

computer means connected to said extractor means to receive said signals extracted thereby and to provide further signals each coded to represent a displacement value in predetermined proportionality to the displacement represented by a respective one of said extracted signals; and translator means connected to said computer means to receive said further signals therefrom, to translate said further signals into command signals and to apply said command signals to said second displacement means.

2. A machine as defined in claim 1, wherein said computer means comprises control means selectable variable to set said predetermined proportionality between zero and unity.

3. A machine as defined in claim 2, wherein said computer means comprises further control means presettable to generate further signals respectively coded to represent displacements of said tool support means from a datum position and corresponding to the minimum and maximum diameters of a workpiece supported by said workpiece support means in operative juxtaposition to said tool support means.

4. A machine as defined in claim 1, wherein said storage means comprises a plurality of serially accessible storage locations each adapted to store a respective signal in said series of signals, and said extractor means comprises read-out means displaceable relative to said locations to serially extract said stored signals in response to said signals output by said divider means and applied to said extractor means.

5. A machine as defined in claim 4, wherein said storage means comprises a loop of perforated tape.

6. A machine as defined in claim 4, wherein said storage means comprises a loop of magnetic tape.

7. A machine as defined in claim 1, wherein said second displacement means comprises a stepping motor, and said command signals generated by said translator means each comprise a plurality of pulsed signals corresponding in number to the incremental displacement represented by the respective one of said extracted signals.

8. A machine as defined in claim 7, comprising fixed-ratio transmission means to couple said stepping motor to said tool support means.

9. A machine as defined in claim 1, wherein said second displacement means comprises a rotatable disc coupled to disc position control means, said position control means being responsive to each said command signal to impart an incremental angular displacement to said disc corresponding to the displacement represented by the extracted signal corresponding to the respective command signal.

* * * * *